June 25, 1929. A. PENN Re. 17,342
AUTOMATIC AIR VOLUME CONTROLLING DEVICE FOR WATER STORAGE TANKS
Original Filed Dec. 12, 1927
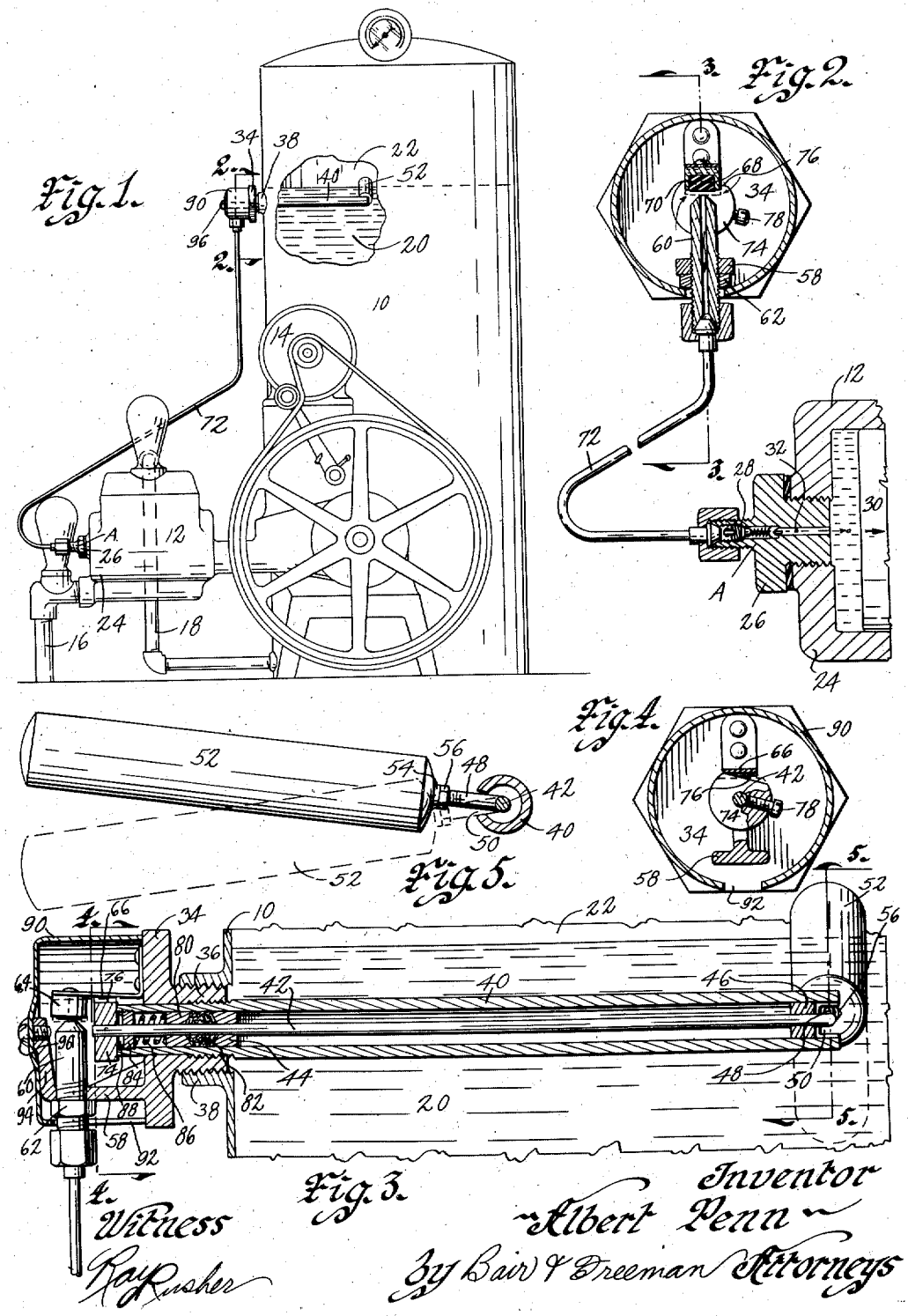

Reissued June 25, 1929. Re. 17,342

UNITED STATES PATENT OFFICE.

ALBERT PENN, OF DES MOINES, IOWA, ASSIGNOR TO PENN ELECTRIC SWITCH COMPANY, OF DES MOINES, IOWA, A COPARTNERSHIP COMPOSED OF RALPH PENN, MARY S. PENN, ALBERT PENN, AND BLANCHE G. PENN.

AUTOMATIC AIR-VOLUME-CONTROLLING DEVICE FOR WATER-STORAGE TANKS.

Original No. 1,674,341, dated June 19, 1928. Serial No. 239,608, filed December 12, 1927. Application for reissue filed February 6, 1929. Serial No. 338,005.

The object of my invention is to provide an automatic air volume controlling device for water storage tanks of simple, durable and comparatively inexpensive construction.

A further object of my invention is to provide a device of this character adapted to be used in connection with a water storage tank and a pump therefor whereby a desired maximum amount of air required for the operation of the water system is at all times automatically maintained within the storage tank.

More particularly it is my object to provide a device of this character comprising a fitting adapted to be secured to a screw threaded boss on the storage tank adjacent the point where the maximum water level is to be controlled and consisting of an air valve opened positively by a float whenever the water in the tank rises above the predetermined level, the valve being connected by a tube to the head of the water pump whereby air will be admitted through the pump to the tank as water is pumped therein.

Still a further object is to design my device whereby the parts projecting into the interior of the storage tank may be conveniently inserted through the opening in which the device is mounted whereby ease of attachment to the tank or removal therefrom is facilitated.

Still a further object is to provide a screw threaded opening in the side of the tank which is adapted to be sealed by the air volume control device, parts of which project into the tank through the screw threaded opening. The parts extending into the tank consisting of the float arm, float and the like are all of such size and shape as to project into the tank through the screw threaded opening. The entire device forms a unitary structure adapted to be mounted directly upon the water storage tank which the device as a unit is adapted to operate with.

With these and other objects in view my invention consists in the construction, arrangement and combination of the various parts of my device, whereby the objects contemplated are attained, as hereinafter more fully set forth, pointed out in my claims and illustrated in the accompanying drawings. Although the invention is susceptible of a variety of embodiments, it is unnecessary to fully describe and illustrate more than one in order to give a full understanding of the invention both from its structural and functional standpoints. Accordingly, I have illustrated a preferred and desirable embodiment of the invention in the accompanying drawings, in which:

Figure 1 is a side elevation of a water storage tank, a water pump therefor and my improved controlling device attached thereto.

Figure 2 is a sectional view on the line 2—2 of Figure 1 illustrating the air valve in section and also illustrating the connection of the air valve to the cylinder of the pump shown in section.

Figure 3 is a detail sectional view on the line 3—3 of Figure 2 illustrating the relation of my device to the storage tank.

Figure 4 is a sectional view on the line 4—4 of Figure 3 illustrating the action of the cam for opening the air valve; and Figure 5 is a sectional view on the line 5—5 of Figure 3 illustrating the float which I use in connection with my device.

In the accompanying drawings I have used the reference numeral 10 to indicate a water storage tank for the purpose of storing a supply of water to be drawn off to faucets or the like. A pump 12 operated by an electric motor 14 is used for pumping water from a well or source of supply through the pipes 16 and 18 and into the storage tank 10. The motor 14 is automatically regulated as to stopping and starting by a pressure controlled switch actuated by the pressure within the tank 10.

The tank 10 is designed to receive and expel the water 20 and in order to do so an air space 22 is necessary above the level of the water. When water is pumped into the tank 10, the size of the air space 22 decreases as the air therein is compressed. The compressed air serves to force the water from the tank 10 after the pump 12 has stopped and the faucets or the like are opened.

The foregoing description is of an ordinary water supply system as used on farms where some other source of water supply is not available. Although I have shown a reciprocating piston type of pump in my drawings, my device can be used in connection with other types of pumps for the same purpose.

Theoretically, the amount of air in the air space 22 will always remain the same as only water is pumped into the tank 10 and only water is drawn therefrom due to the connections being at the bottom of the tank. However, in actual practice some of this air is absorbed by the water and passes out through the faucets. This results in the level of the water 20 gradually rising in the tank 10 until only a small air space is left. It is desirable to have a considerable air space so that after the pump has been stopped, several gallons of water may be withdrawn from the tank before it is again necessary to start and operate the pump. As the air space decreases, the pump 12 starts when only a small amount of water has been withdrawn from the tank. This results in the starting and stopping of the pump when even a small quantity of water is withdrawn from the tank at one time. With the air space 22 of the right proportions several gallons of water may be withdrawn from the tank 10 at any spaced intervals resulting in the pump 12 not being started during this time.

Another advantage when the amount of air within the storage tank is held at a maximum or desired amount, is that in case the motor does not operate due to the electric current being cut off for some time, there is still in the tank a sufficient amount of air so that all the water may be drawn from the tank. I therefore provide a device for automatically maintaining the proper amount of air space within the tank at all times.

The hand or manually controlled way of regulating the air space is herebelow set forth.

To overcome the air space 22 diminishing to an undesirably small volume, a valve indicated generally by the reference character A is mounted in the head of the cylinder 24 of the pump 12. The valve A comprises a fitting 26 having received therein an ordinary tire type valve 28 which is generally capped by an ordinary tire cap which I have not shown. The valve A is provided on all water pumps and the tanks 10 are usually provided with water gauges so that the level of water in the tank can be observed. When the water level is adjacent the top of the water gauge, the operator of the system must remove the cap on the valve A which allows air to enter on the suction stroke of the piston 30. In Figure 2 I have illustrated this action wherein bubbles 32 have been drawn through the valve 28 and into the cylinder 24. Then after the water level has been lowered to a point adjacent the bottom of the water gauge, the tire cap is replaced on the valve A so that no more air will be drawn into the pump and forced into the tank.

It has been my primary object to provide an automatic device which will operate at all times without attention for admitting air through the valve A whenever the level of water in the tank becomes too high. My device comprises a fitting 34 having a screw threaded extension 36 adapted to be screwed into a boss 38 surrounding an opening formed in the side of the tank 10 adjacent the point at which the water level is to be maintained. The use of a water sight gauge is entirely eliminated, my device taking care of the water level so that it requires no attention.

The fitting 34 is formed with a bore open at both ends and is internally screw threaded at its inner end to receive a tube 40 or other type of arm to support a float. The tube 40 extends toward the interior of the tank 10 and is designed to rotatably receive a shaft or float arm 42. The shaft 42 is journaled in sleeves 44 and 46 pressed into the tube 40; and projects beyond the fitting and tube on the exterior of the tank. The fitting 34 when secured in the boss 38 entirely seals the opening in the side of the tank.

The shaft 42 is bent at right angles to form a float arm 48. The float arm 48 extends through a slot 50 formed in the inner end of the tube 40. The edges of the slot 50 act as stops for the float arm 48.

The end of the arm 48 is screw threaded whereby it may be connected to a float 52. The float 52 has a screw threaded boss 54 to coact with the end of the arm 48. A lock nut 56 is provided for locking the float 52 relative to the float arm 48.

The fitting 34 is provided with an extension 58 having a screw threaded opening to receive a valve tube 60. The valve tube 60 is provided with a lock nut 62 for locking the tube relative to the extension 58. A valve member 64 coacts with the upper end of the valve tube 60 and is held thereagainst by a spring 66 lying in the path of movement of the float shaft or a part thereof. The spring 66 is connected to the fitting 34 and serves to support the valve member 64.

The valve member 64 is provided with a socket 68 in which is forced a rubber or composition plug 70. The upper end of the valve tube 60 is tapered to form a sharpened edge around the opening in this tube with which the plug 70 coacts for normally closing the tube 60. The valve tube 60 is connected by a tube 72 preferably of copper and small in diameter to the valve A.

From the foregoing description it will be obvious that when the valve member 64 is raised, air will enter the valve tube 60 and flow through the tube 72 into the pump 12 whereby it will be pumped into the storage tank 10 with the incoming supply of water.

For raising the valve member 64 I provide a cam 74 mounted on the projecting end of the shaft 42. The cam 74 is provided with a flat portion 76 which normally assumes the dotted line position illustrated in Figure 4 when the float 52 is at its lower position as illustrated in dotted lines in Figure 5. The cam 74 is secured to the shaft 42 by a set screw 78. When the cam 74 is moved to the full line position shown in Figure 4, the valve member 64 will be raised as illustrated in Figures 2 and 3 of the drawings.

For preventing leakage around the shaft 42 I provide a packing sleeve 80 slidably mounted inside the tube 40. Between the packing sleeve 80 and the sleeve 44 (which is also provided with a tapered packing surface) I mount a packing material 82. The outer end of the tube 40 extends through the fitting 34 and is internally screw threaded to receive a plug 84. Between the plug 84 and the movable sleeve 80 is a spring 86 which will at all times maintain the packing 82 tight without further attention. The plug 84 is provided with a screw driver slot 88 whereby it may be positioned in the end of the tube 40.

For covering the parts extending beyond the fitting 34 I provide a casing 90. The casing 90 has a slot 92 to extend around the valve tube 60 when the casing is inserted in position. An arm 94 and a screw 96 provide a means for connecting the casing 90 to the fitting 34. The arm 94 is merely an extension of the bracket 58.

*Practical operation.*

In the operation of my device assuming that there is sufficient predetermined amount of air in the tank 10 to operate properly, the float 52 will assume the dotted line position illustrated in Figure 5 with the arm 48 resting against the lower edge of the slot 50. As long as there is sufficient air in the tank to properly expel water from the tank without cutting the motor 14 into and out of circuit except as a considerable quantity of water is withdrawn from the tank, my device will remain inoperative. However, when the air space 22 is diminished to a predetermined point so that the float 52 will be raised by the level of the water in the tank, the valve member 64 will be raised for allowing air to enter the pump. This will continue until the maximum high water level has been sufficiently lowered for proper operation of the water system and for allowing the proper air space above the water.

My device maintains in the tank, a proper predetermined air space wherein the amount of water withdrawn from the tank may be of considerable volume before the pump is again thrown into operation.

Some changes may be made in the construction and arrangement of the parts of my device without departing from the real spirit and purpose of my invention, and it is my intention to cover by my claims, any modified forms of structure or use of mechanical equivalents, which may be reasonably included within their scope.

I claim as my invention:

1. A float controlled air valve comprising a fitting adapted to be screwed into a tank, a tube extending therefrom, a shaft in said tube, a float at the end of said tube and connected with said shaft for rotating the same, said tube and float being adapted to be inserted in said tank through the opening which receives said fitting and a valve on said fitting adapted to be opened by rotation of said shaft caused by said float when liquid in the tank rises to a predetermined level.

2. A float controlled air valve comprising a fitting adapted to be screwed into a tank, a tube extending therefrom, a shaft in said tube, a float at the end of said tube and connected with said shaft for rotating the same, said tube and float being adapted to be inserted in said tank through the opening which receives said fitting, a valve tube on said fitting, a valve member normally contacting with one end of said tube, a cam on said shaft adapted to raise said member upon actuation of the shaft caused by the rise of liquid in said tank to a predetermined level which causes said float to be raised.

3. An air volume control for tanks, comprising a fitting having a bore open at both ends, a packing in the bore of said fitting, a float having an arm extending into the bore of said fitting and projecting through and surrounded by the packing and extending into the open outer end of the fitting, an air passage in the fitting adjacent to the projecting end of the float arm, and a valve for said air passage arranged in cooperative relation with the float arm and adapted to be positively operated by the movements of the float arm to open and close the air passage, said fitting and its attached float and arm and valve adapted to be passed through and sealed into an opening in the tank.

4. An air volume control for tanks, comprising a fitting adapted to be secured in and to form a closure for an opening in a tank, said fitting being formed with a bore open at both ends, a packing member arranged in said bore, a float rod extending through said fitting and through the packing member from the interior to the exterior of the tank, said float rod extending through the packing member and being arranged for movement with respect thereto, a float carried by the inner end portion of said float rod, an air passage at the outer portion of the fitting, a valve member arranged to normally close said air passage, said float rod acting positively to move said valve member to open position by movement of said float when liquid in the tank rises to a predetermined level.

5. A float controlled air valve, comprising a fitting adapted to be secured in and to form a closure for an opening in a tank for sealing said opening, a float arm carried by said fitting, a float on said arm, a valve member carried by said fitting on the exterior of said tank, said valve member being normally closed, said float arm arranged to positively open said valve by direct action thereon when liquid in the tank rises to a predetermined level, said float arm and float being capable of being inserted through the opening in said tank and together with said valve member being supported solely by said fitting whereby a unitary structure is provided.

Des Moines, Iowa, January 14, 1929.

ALBERT PENN.